(12) United States Patent
Kempter et al.

(10) Patent No.: US 10,100,837 B2
(45) Date of Patent: Oct. 16, 2018

(54) TRANSMISSION AND GEARED COMPRESSOR SYSTEM

(71) Applicant: Voith Patent GmbH, Heidenheim (DE)

(72) Inventors: Ulrich Kempter, Burgberg (DE); Jens Kunze, Bad Hindelang (DE); Thomas Horn, Immenstadt (DE); Michael Schmid, Fischen (DE)

(73) Assignee: Voith Patent GmbH, Heidenheim (DE)

( * ) Notice: Subject to any disclaimer, the term of this patent is extended or adjusted under 35 U.S.C. 154(b) by 310 days.

(21) Appl. No.: 14/889,706

(22) PCT Filed: Apr. 28, 2014

(86) PCT No.: PCT/EP2014/058559
§ 371 (c)(1),
(2) Date: Nov. 6, 2015

(87) PCT Pub. No.: WO2014/180688
PCT Pub. Date: Nov. 13, 2014

(65) Prior Publication Data
US 2016/0115963 A1 Apr. 28, 2016

(30) Foreign Application Priority Data
May 8, 2013 (DE) .......................... 10 2013 208 564

(51) Int. Cl.
*F04D 25/02* (2006.01)
*F04D 25/16* (2006.01)
*F16H 1/20* (2006.01)

(52) U.S. Cl.
CPC ........... *F04D 25/02* (2013.01); *F04D 25/163* (2013.01); *F16H 1/20* (2013.01)

(58) Field of Classification Search
CPC ...... F04D 25/02; F04D 25/028; F04D 25/163; F04D 29/054; F16H 1/20; F16H 1/206
See application file for complete search history.

(56) References Cited

U.S. PATENT DOCUMENTS 5,154,571 A 10/1992 Prümper
5,382,132 A * 1/1995 Mendel ................. F04D 25/163
415/122.1

(Continued)

FOREIGN PATENT DOCUMENTS

DE            295 20 260 U1    3/1996
DE   10 2012 022 131 A1    5/2014

(Continued)

OTHER PUBLICATIONS

Observations by Third Party dated Mar. 14, 2016 in parallel European Patent Application No. 14720120.6 (2 pages).

(Continued)

*Primary Examiner* — Justin Seabe
*Assistant Examiner* — Brian P Wolcott
(74) *Attorney, Agent, or Firm* — Taylor IP, P.C.

(57) ABSTRACT

An integral transmission; comprising a driving gear connected to a driving shaft for co-joint rotation, a large gear engaging with the driving gear, a first driven gear engaging with the large gear, and at least one additional driven gear which engages with the driving gear; wherein an axis of rotation of the driving gear and an axis of rotation of the first driven gear engaging with the large gear are arranged in a plane of alignment, an axis of rotation of the large gear is offset in the vertical direction with respect to the plane of alignment, and an axis of rotation of the at least one additional driven gear engaging with the driving gear is located in the plane of alignment. A geared compressor system; comprising the integral transmission and a drive unit.

11 Claims, 2 Drawing Sheets

(56) References Cited

U.S. PATENT DOCUMENTS

| | | | |
|---|---|---|---|
| 5,485,719 A | 1/1996 | Wulf | |
| 5,611,663 A | 3/1997 | Kotzur | |
| 6,116,027 A | 9/2000 | Smith et al. | |
| 6,264,910 B1 | 7/2001 | Maurer et al. | |
| 6,393,865 B1 | 5/2002 | Coakley et al. | |
| 7,559,200 B2 * | 7/2009 | Rodehau | F04D 25/163 60/605.1 |
| 9,512,849 B2 * | 12/2016 | Naβ | F04D 25/02 |
| 9,714,658 B2 * | 7/2017 | Miyata | F04D 17/12 |
| 2014/0161588 A1 | 6/2014 | Miyata et al. | |

FOREIGN PATENT DOCUMENTS

| | | |
|---|---|---|
| EP | 0 440 902 A1 | 11/1990 |
| EP | 0 602 491 A1 | 12/1993 |
| EP | 1 067 291 B1 | 1/2001 |
| EP | 1 205 721 A1 | 5/2002 |
| EP | 1 302 668 A1 | 4/2003 |
| EP | 1 691 081 A2 | 1/2006 |
| EP | 2 083 172 A1 | 7/2009 |
| EP | 2 128 448 A2 | 12/2009 |
| EP | 2 604 862 A1 | 6/2013 |
| EP | 2 740 941 A1 | 6/2014 |
| GB | 967 091 | 8/1964 |
| WO | 01/04477 A1 | 1/2001 |
| WO | 2013/041452 A1 | 3/2013 |
| WO | 2013/087606 A1 | 6/2013 |

OTHER PUBLICATIONS

Notice of Transmission of the International Research Report and the Written Notice Issued the International Searching Authority or Declaration dated Aug. 7, 2014 for International Application No. PCT/EP2014/058559 (8 pages).

\* cited by examiner

TRANSMISSION AND GEARED COMPRESSOR SYSTEM

BACKGROUND OF THE INVENTION

1. Field of the Invention

The invention relates to a transmission, in particular an integral transmission. The invention further relates to a geared compressor system.

2. Description of the Related Art

Transmissions, in particular integral transmissions are known in a multitude of designs.

They are part of machine lines for driving of compressors. Reference is made to the documentations listed below:

EP 2 128 448 A2
EP0 0440 902 A1
EP 0602 491 B1

Transmissions of this type are generally whereby a driving shaft that is connected with a drive unit in the embodiment of an electric motor or a turbine, and that is equipped with a helical driving gear that engages at least indirectly with two or more driven gears. The driven gears are connected with driven shafts for co joint rotation or are integral with them; said shafts being connected for co-joint rotation with the impellers of the compressors.

One design is already known from EP1691081B1 wherein the driving gear is arranged as an intermediate gear between a driven gear and a gear designated as a large gear. The gearing down to low speed occurs via the large gear. In addition to a substantial overall width, the loads acting upon the driving gear require an appropriate design, in particular with regard to the tooth system and mounting.

What is needed in the art is a transmission, in particular an integral transmission of the type described at the beginning that, besides a small size, is characterized by an optimized load distribution.

SUMMARY OF THE INVENTION

The present invention provides a transmission, in particular integral transmission, including a driving gear connected to a driving shaft for co joint rotation; including an additional gear described as a large gear engaging with the driving gear; including a first driven gear engaging with the large gear, wherein the axes of rotation of the driving gear and that of a first driven gear engaging with the large gear are arranged in a plane of alignment, whereby the axis of rotation of the large gear is offset in the vertical direction with respect to the plane of alignment of the driving gear and the first driven gear.

An integral transmission is understood to be a transmission that is used in compressor and/or expander systems.

The individual driving shafts and driven shafts are arranged parallel to one another. As a result of the displacement of the large gear in a vertical direction, the offset arrangement permits engagement of the driving gear and a driven gear in an outside circumferential region that—viewed in the direction of extension of the transmission perpendicular to the axes of rotation of the individual gears—is characterized by a narrower width than the diameter of the large gear. The extension of the transmission in this direction is thus considerably shortened. The offset arrangement of the large gear moreover offers the advantage of better compensation of transverse forces and thereby optimization of load distribution within the transmission, which is reflected in an increase of the service life of the transmission components, in particular the mounting.

One advantageous arrangement provides at least one additional driven gear which engages with the driving gear, wherein the axis of rotation of the additional driven gear is located in the plane of alignment of the driving gear and the first driven gear. This arrangement allows ease of assembly of driving shafts and driven shafts in the region of a partition of the transmission housing.

To ensure effective operation in a geared compressor system having at least two compressors, at least one additional driven gear is provided which engages with the large gear, and whose axis of rotation is arranged offset relative to the plane of alignment of the driving gear and the first driven gear.

In one advantageous design form the driving gear and/or the first and/or the additional driven gears are in the embodiment of pinions which are connected with pinion shafts for co-joint rotation or which form an integral component with same. The component and assembly expenditure is thereby considerably reduced.

Viewed in installation position, the plane of alignment is preferably consistent with a horizontal plane.

One geared compressor system according to the invention comprises a drive unit and a transmission unit according to one of the claims 1 to 6, wherein the drive unit is connected with the driving shaft of the transmission unit and the first driven shaft is connected for co-joint rotation with an impeller of at least a first compressor stage. In an advantageous arrangement the geared compressor system is designed having at least two compression stages and the additional driven shaft of the transmission is connected for co-joint rotation with at least one impeller of an additional compression stage.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
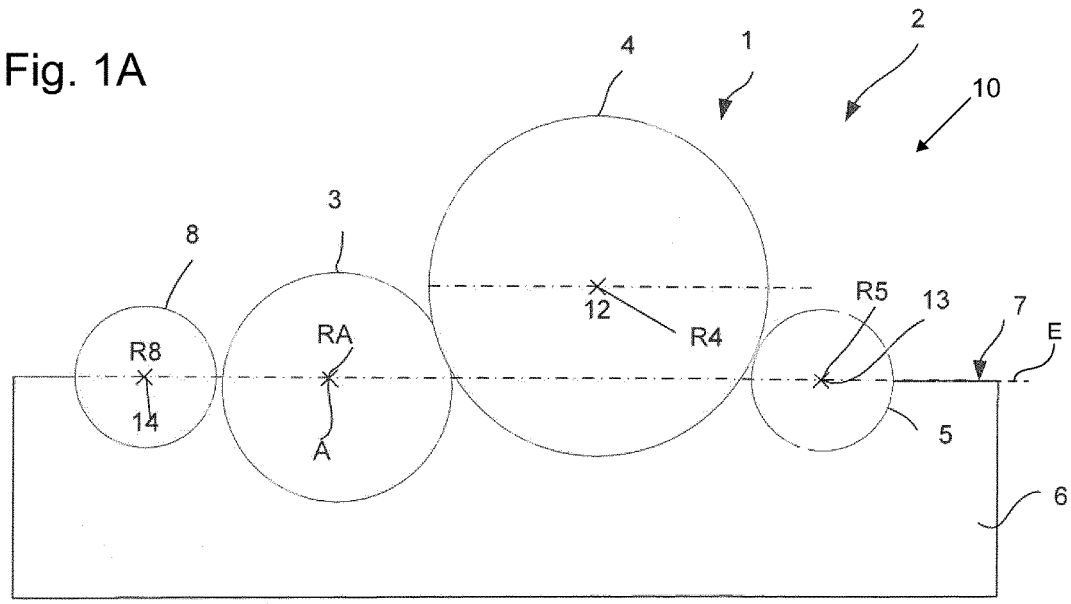
FIG. 1*a* illustrates in simplified schematic illustration the basic construction of an integrated transmission in a front view.
Figure 1B:
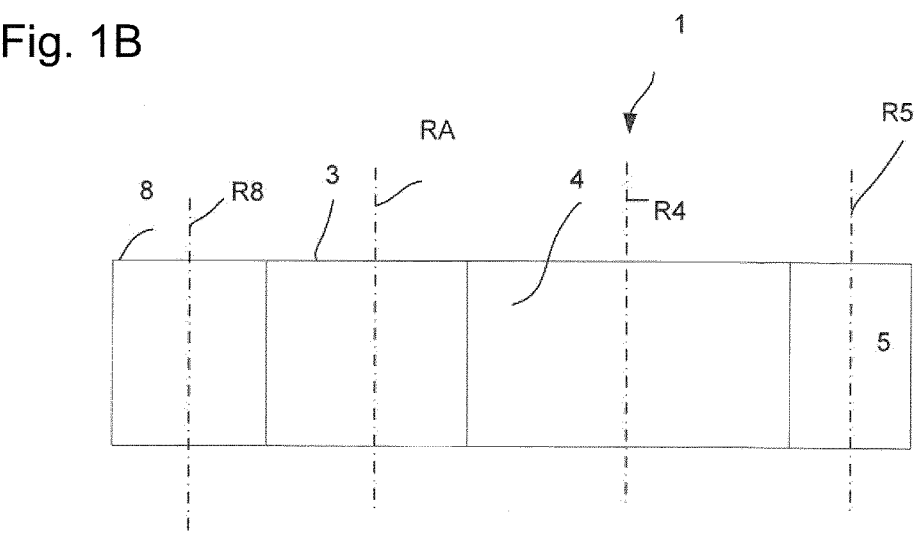
FIG. 1*b* illustrates in simplified schematic illustration the basic construction of an integrated transmission in a top view.

In a simplified schematic illustration FIGS. 1*a* and 1*b* depict the basic construction of a transmission 1, in particular of an integral transmission for a geared turbo compressor of machine line 2, in particular a geared compressor system 10. FIG. 1a shows the arrangement of the essential transmission elements in a frontal view; FIG. 1b is a top view. This includes a driving gear 3, connected to a driving shaft A for co-joint rotation, a large gear 4 engaging with driving gear 3 and a first driven gear 5 engaging with a large gear 4. Driving gear 3 is preferably a single component with driving shaft A; in other words, an integral component in the embodiment of a shaft with a mounted pinion. The axis of rotation of driving shaft A is identified as RA. Large gear 4 is connected with a shaft for co joint rotation or is designed integral with same. The shaft supporting large gear 4 is identified as 12 and the axis of rotation as R4. Correspondingly, driven gear 5 is connected for co joint rotation with a shaft that is designated as a driven shaft 13, or is designed as an integral component. The axis of rotation is identified as R5.

Axes of rotation RA of driving gear 3 and R5 of first driven gear 5 that engages with large gear 4 are arranged in a plane of alignment E. Shafts A and 13 can be mounted in a transmission housing 6—whereby only the lower housing part is indicated in its installation position—in a common parting line 7 between the housing components, whereby the plane of alignment E in installation position is formed by a horizontal plane. For better load distribution and realization of a more compact construction in the axial direction, axis of rotation R4 of large gear 4 according to the invention is offset in the vertical direction with respect to the plane of alignment E of driving gear 3 and first driven gear 5. Shaft 12 that is supporting large gear 4 is arranged above the plane of alignment E. The offset is such that the angle between a theoretically assumed connecting line between axis of rotation RA of driving shaft A and axis of rotation R4 of large gear 4, as well as of axis of rotation R4 of the large gear and axis of rotation R5 of first driven gear 5, is in a range of 130° to 175°.

Preferably at least one additional second driven gear 8 is provided that engages with driving gear 3, whereby the axis of rotation R8 of the additional driven gear 8 is located in the plane of alignment E of driving gear 3 and first driven gear 5. Individual driven gears 5 and 8 are always connected for co-joint rotation with driven shafts 13, 14, whereby the connection is either frictional or positive or occurs via the single component design of the gears as pinions with the respective shafts, in other words as an integral component in the embodiment of a shaft with mounted pinion.

Mounting of driving shaft A, of shaft 12 supporting large gear 4 and of individual driven shafts 13, 14 occurs in housing 6, whereby the mountings are supplied with lubricant, preferably via a common supply system 9.

Large gear 4, as well as gears 3, 5, 8 are helical gears. As a result of the arrangement of large gear 4 being offset in the vertical direction, an optimal load distribution is achieved.

Figure 2A:
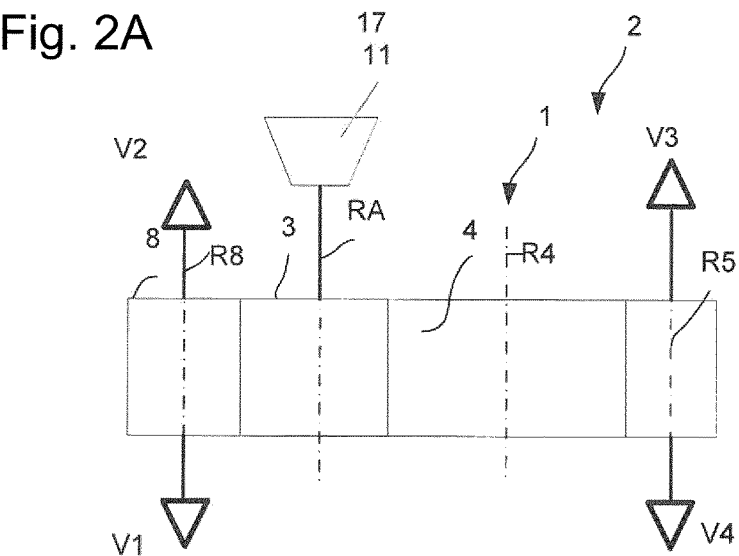
FIG. 2*a* illustrates an first embodiment of a transmission in an application as an integral transmission in a geared compressor system having a drive unit in the embodiment of a turbine.

FIG. 2a shows an advantageous application in a machine line of a geared compressor system 10 having a drive unit 11, a transmission 1 for driving the at least one or several compressors V1 to Vn, in this case V1, V2, V3 and V4. The transmission is designed as described in FIGS. 1a and 1b. Driving shaft A is connected with a drive unit 11. Individual driven shafts 13 and 14 that are connected with driven gears 5 and 8 are each connected with a compressor, in particular to support an impeller of such a compressor V1 to V4.

Figure 2B:
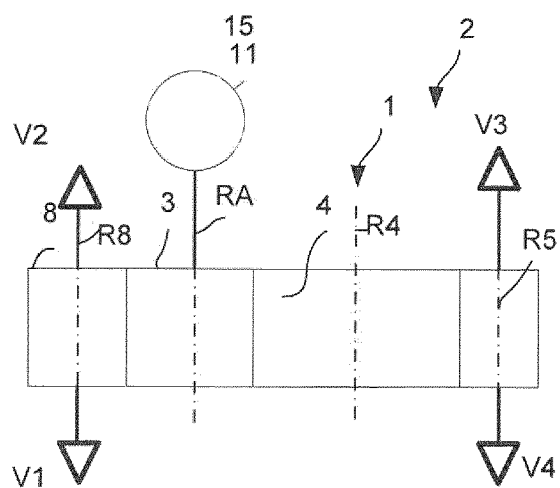
FIG. 2*b* illustrates a second embodiment of a transmission in an application as an integral transmission in a geared compressor system having a drive unit in the embodiment of an electric motor.

The drive unit according to FIG. 2a is in the embodiment of a turbine 17, in particular a steam turbine. FIG. 2b in contrast illustrates another embodiment, with a drive unit in the embodiment of an electric motor 15.

Figure 2C:
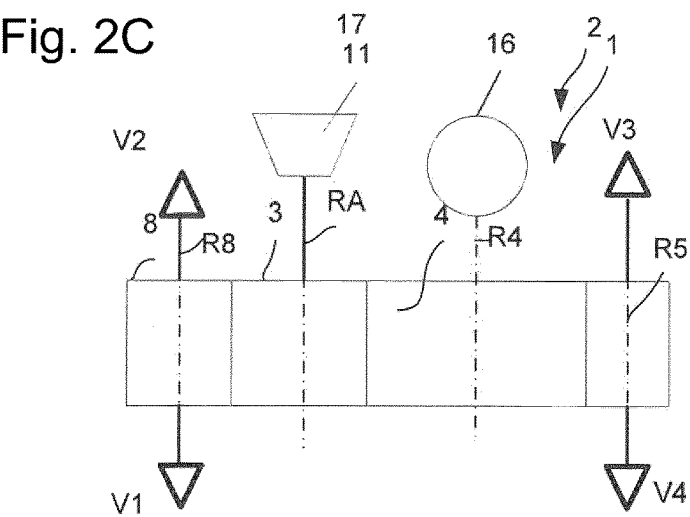
FIG. 2*c* illustrates a third embodiment of a transmission in an application as an integral transmission in a geared compressor system according to FIG. 2*a* with an additional electric motor.

FIG. 2c illustrates another embodiment of FIG. 2a having an additional electric motor 16 on large gear 4. Electric motor 16 is coupled with shaft 12 of large gear 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 transmission, in particular integral transmission
2 machine line
3 driving gear
4 large gear
5 driven gear
6 housing
7 parting line
8 driven gear
9 supply system
10 geared compressor system
11 drive unit
12 shaft
13 driven shaft
14 driven shaft
15 electric motor
16 electric motor
17 turbine
V1, V2 compressor
A driving shaft
R3, R4,
RA, R5, R8 axis of rotation
E plane of alignment

The invention claimed is:
1. An integral transmission, comprising:
a driving gear connected to a driving shaft for co-joint rotation;
a large gear engaging with the driving gear;
a first driven gear engaging with the large gear; and
at least one additional driven gear which engages with the driving gear;
wherein an axis of rotation of the driving gear and an axis of rotation of the first driven gear engaging with the large gear are arranged in a plane of alignment;
wherein an axis of rotation of the large gear is offset in a vertical direction above the plane of alignment;
wherein an axis of rotation of the at least one additional driven gear engaging with the driving gear is located in the plane of alignment; and
wherein a line from the axis of rotation of the large gear to the axis of rotation of the driving gear forms an angle that is in a range of 130° to 175° relative to the plane of alignment.
2. The integral transmission of claim 1, further comprising a transmission housing having a parting line that is aligned with the plane of alignment.
3. The integral transmission of claim 1, wherein at least one of the driving gear and the first driven gear and the at least one additional driven gear are pinions which are connected with pinion shafts for co-joint rotation, or which form an integral component with the pinion shafts.

4. The integral transmission of claim 1, wherein the plane of alignment is a horizontal plane.

5. The integral transmission of claim 1, wherein the driving gear and the first driven gear and the at least one additional driven gear have helical toothing arrangements.

6. A geared compressor system, comprising:
a drive unit, wherein said drive unit is connected with a driving shaft of an integral transmission, and a first driven shaft is connected for co-joint rotation with at least one impeller of at least a first compressor stage; and wherein said integral transmission includes:
a driving gear connected to a driving shaft for co-joint rotation;
a large gear engaging with the driving gear;
a first driven gear engaging with the large gear; and
at least one additional driven gear which engages with the driving gear;
wherein an axis of rotation of the driving gear and an axis of rotation of the first driven gear engaging with the large gear are arranged in a plane of alignment;
wherein an axis of rotation of the large gear is offset in a vertically upward direction with respect to the plane of alignment;
wherein an axis of rotation of the at least one additional driven gear engaging with the driving gear is located in the plane of alignment; and
wherein a line from the axis of rotation of the large gear to the axis of rotation of the driving gear forms an angle that is in a range of 130° to 175° relative to the plane of alignment.

7. The geared compressor system of claim 6, further comprising a transmission housing having a parting line that is aligned with the plane of alignment.

8. The geared compressor system of claim 6, wherein a drive shaft of an at least one additional drive gear is connected for co-joint rotation with an at least one impeller of an additional compressor stage.

9. The geared compressor system of claim 6, wherein at leas one of the driving gear and the first driven gear and the at least one additional driven gear are pinions which are connected with pinion shafts for co-joint rotation, or which form an integral component with the pinion shafts.

10. The geared compressor system of claim 6, wherein the plane of alignment is a horizontal plane.

11. The geared compressor system of claim 6, wherein the driving gear and the first driven gear and the at least one additional driven gear have helical toothing arrangements.

* * * * *